United States Patent [19]

Fukui et al.

[11] Patent Number: 5,407,042
[45] Date of Patent: Apr. 18, 1995

[54] PROPELLING TRANSMISSION STRUCTURE FOR A WORKING VEHICLE

[75] Inventors: Tetsu Fukui; Takeshi Ura; Shigekazu Hasegawa, all of Osaka, Japan

[73] Assignee: Kubota Corporation, Japan

[21] Appl. No.: 63,897

[22] Filed: May 18, 1993

[30] Foreign Application Priority Data

Jul. 3, 1992 [JP] Japan .................. 4-175854

[51] Int. Cl.⁶ .................. B60K 41/22; F16D 25/11
[52] U.S. Cl. .................. 192/3.58; 192/51; 192/87.13; 192/109 F
[58] Field of Search .................. 192/3.57, 3.58, 51, 192/87.13, 87.18, 109 F; 74/359, 360, 361, 745, 15.66, 15.8, 15.82, 15.88

[56] References Cited

U.S. PATENT DOCUMENTS

| | | | |
|---|---|---|---|
| 3,442,346 | 5/1969 | Winter et al. | 74/15.88 X |
| 4,023,418 | 5/1977 | Zenker | 74/360 X |
| 4,711,329 | 12/1987 | Hasegawa et al. | 192/3.57 |
| 4,794,807 | 1/1989 | Horii et al. | 74/15.66 X |
| 4,881,417 | 11/1989 | Yoshii et al. | |
| 5,024,306 | 6/1991 | Fukui et al. | |
| 5,058,455 | 10/1991 | Nemoto et al. | 74/745 X |
| 5,072,814 | 12/1991 | Hama et al. | 192/3.57 |
| 5,109,964 | 5/1992 | Fukui et al. | |

FOREIGN PATENT DOCUMENTS

| | | | |
|---|---|---|---|
| 4-39464 | 2/1992 | Japan . | |
| 4-231219 | 8/1992 | Japan | 192/51 |
| 1109357 | 4/1968 | United Kingdom . | |

Primary Examiner—Richard M. Lorence
Attorney, Agent, or Firm—Webb Ziesenheim Bruening Logsdon Orkin & Hanson

[57] ABSTRACT

A control system for controlling change speed gearing (A) of a vehicle for transmitting output of an engine (1) in varied speeds to wheels. This system has a first clutch mechanism mounted in a drive transmitting line between the engine and the change speed gearing, the first clutch mechanism including two hydraulically operable clutches (5, 6) for forward drive and backward drive, and a backward-forward changeover valve (32) for selectively operating the two clutches; a second clutch mechanism mounted in a drive transmitting line between the change speed gearing and the wheels, the second clutch mechanism including a quick operating clutch (19) for quickly making and breaking drive transmission, and a clutch control valve (26) for controlling the quick operating clutch; actuators (T1, T2) for shifting the change speed gearing; and a control unit (30) operatively connected to the backward-forward changeover valve, clutch control valve and actuators. In response to start of a shifting operation of the actuators, the quick operating clutch is disengaged and an engaged one of the hydraulically operable clutches of the first clutch mechanism is reduced to a predetermined low pressure. In response to completion of the shifting operation of the actuators, the quick operating clutch is engaged and the clutch of the first clutch mechanism is gradually raised from the predetermined low pressure.

8 Claims, 3 Drawing Sheets

The Working Pressure of Forward or Backward Drive Clutch (5,6)

The State of Quick Operating Clutch (19)

PROPELLING TRANSMISSION STRUCTURE FOR A WORKING VEHICLE

BACKGROUND OF THE INVENTION

1. Field of the Invention

The present invention relates to a propelling transmission structure for a working vehicle having change speed gearing.

2. Description of the Related Art

One example of propelling transmission structure for a working vehicle is disclosed in Japanese Patent Publication Kokai No. 4-39464. According to this structure, in response to a change speed command, propelling clutches are hydraulically and automatically disengaged, actuators are driven to shift change speed gearing, and the propelling clutches are automatically engaged again.

This structure includes two main clutches acting as the propelling clutches, i.e. a first clutch (6 in FIG. 6 of the above publication) for transmitting drive from an engine to the change speed gearing, and a second clutch (19 in FIG. 6 of the publication) mounted in a drive transmitting line from the change speed gearing to drive wheels. In response to a change speed command, the second clutch is disengaged, with a working pressure for the first clutch reduced to a predetermined low level just enough to disengage the first clutch. Then, the actuators are driven to shift the change speed gearing.

Next, the second clutch is engaged quickly, and the working pressure for the first clutch is raised gradually from the predetermined low level to engage the first clutch.

By operating the first and second clutches and actuators in this way, the time consumed in one change speed operation is shortened while diminishing a shock occurring with this operation (a shock accompanying engagement of the first clutch).

However, the above structure includes a gear shift type backward-forward changeover device disposed downstream of the first clutch, change speed gearing and second clutch. With the two main clutches as well as the change speed gearing mounted in one drive transmitting line, the transmission system as a whole has a complicated structure and is costly. Thus, them is room for improvement.

SUMMARY OF THE INVENTION

The object of the present invention is to provide a transmission system with simplified components, which has a backward-forward changeover function, and change speed gearing easily operable by actuators.

The above object is fulfilled, according to the present invention, by a change speed control system for a vehicle having the following construction.

A hydraulically operable forward drive clutch and a hydraulically operable backward drive clutch are arranged coaxially and immediately downstream of an engine. The system further includes propelling change speed gearing disposed downstream of the forward drive clutch and backward drive clutch, and a quick operating clutch acting as a second clutch mechanism disposed downstream of the change speed gearing for quickly making and breaking drive transmission.

Further, a backward-forward changeover device is provided for selectively supplying pressure oil to the forward drive clutch and backward drive clutch to switch between forward drive and backward drive. The forward drive clutch, backward drive clutch and backward-forward changeover device constitute a first clutch mechanism. The change speed gearing has shift gears slidable by actuators in response to a change speed command.

The system further includes a first control means and a second control means. The first control means is operable, in response to start of a shifting operation of the actuators carded out for the forward drive clutch or backward drive clutch whichever is engaged, to disengage the quick operating clutch and to reduce the working pressure of an engaged one of the forward drive clutch and backward drive clutch to a predetermined low level. The second control means is operable, in response to completion of the shifting operation of the actuators, to engage the quick operating clutch and to raise the working pressure of the forward drive clutch or backward drive clutch gradually from the predetermined low level.

With the above structure, when the forward drive clutch is engaged, the drive of the engine is transmitted in forward rotation to the change speed gearing disposed downstream. When the backward drive clutch is engaged, the drive is transmitted in backward rotation to the change speed gearing. Backward-forward drive switching is effected in this way.

When the change speed gearing is shifted by the actuators, the quick operating clutch is quickly disengaged, and the working pressure of the forward drive clutch or backward drive clutch is reduced to a predetermined low level. Upon completion of the shifting operation by the actuators, the quick operating clutch is quickly engaged, and the working pressure of the forward drive clutch or backward drive clutch is gradually raised from the predetermined low level. Thus, the change speed gearing is shiftable by the actuators smoothly and without a shock as in the prior art structure.

The forward drive clutch and backward drive clutch in the present invention have the functions of the backward-forward changeover device as well as the first clutch to transmit engine drive to the change speed gearing in the prior structure.

Consequently, the change speed system according to the present invention does not require the first clutch provided in the prior an to make and break transmission of the engine drive. That is, compared with the prior art, the system according to the present invention includes one less clutch. This system, therefore, has a simplified structure as a whole.

Other features and advantages of the invention will be apparent from the following description of the preferred embodiment.

DETAILED DESCRIPTION OF THE PREFERRED EMBODIMENT

An embodiment of the present invention will be described with reference to the drawings.

Figure 1:
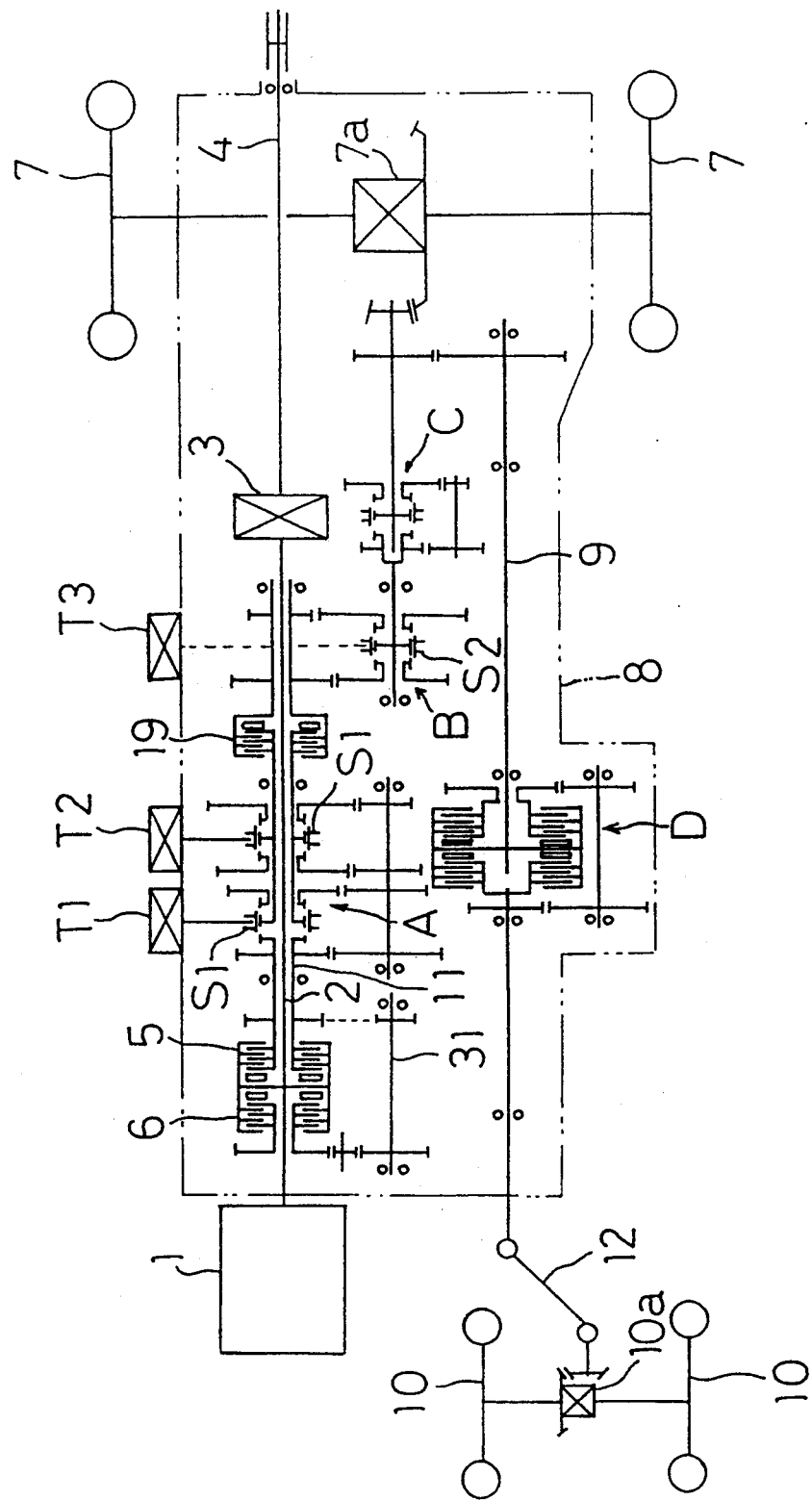
FIG. 1 is a diagram schematically showing a propelling transmission system mounted in a transmission case.

FIG. 1 shows the interior of a transmission case 8 of an agricultural tractor which is one example of four wheel drive working vehicles. The tractor has a PTO system for transmitting drive from an engine 1 through a first transmission shaft 2 and a clutch mechanism 3 to a PTO shaft 4. The tractor also has a propelling system for transmitting drive from the engine 1 through a hydraulically operable forward drive clutch 5 or a hydraulically operable backward drive clutch 6, a sleeve shaft 11, a main change speed device A (corresponding to change speed gearing), a quick operating clutch 19, a first auxiliary change speed device B, a second auxiliary change speed device C and a rear differential 7a to rear wheels 7. The drive a branched out immediately upstream of the rear differential 7a is transmitted to front wheels 10 through a hydraulically operable front wheel change speed device D, a front wheel transmission shaft 12 and a front differential 10a.

Each of the forward drive clutch 5 and backward drive clutch 6 has a combination of friction plates (not shown) and a piston (not shown), and is engageable when pressure oil is supplied thereto. These clutches 5 and 6 combined with a backward-forward changeover device constitute a first clutch mechanism. The forward drive clutch 5 and backward drive clutch 6 are arranged immediately downstream of the engine 1, whereby controls for making or breaking the drive transmission from the engine to the change speed gearing A may be effected in the most upstream position. Thus, these clutches 5 and 6 have a function to control the drive transmission from the engine to the change speed gearing A. When the forward drive clutch 5 is engaged, the drive of the engine 1 is transmitted through the clutch 5 directly to the sleeve shaft 11 to drive the tractor forward. When the backward drive clutch 6 is engaged, the drive of the engine 1 is transmitted in backward rotation through the clutch 6 and a transmission shaft 31 to the sleeve shaft 11 to drive the tractor backward.

The main change speed device A is the synchromesh type including two shift gears S1 slidable to provide four speeds. The first auxiliary change speed device B also is the synchromesh type including a shift gear S2. The two shift gears S1 of the main change speed device A are slidable by hydraulic cylinders T1 and T2 (corresponding to actuators). The shift gear S2 of the first auxiliary change speed device B is slidable by a hydraulic cylinder T3.

A hydraulic control system is provided to hydraulically control a shifting operation of the hydraulic cylinders T1, T2 and T3, such that the forward drive clutch 5 and backward drive clutch 6 are placed in a reduced pressure condition and the quick operating clutch 19 disengaged upon start of the shifting operation, and that the clutches 5, 6 and 19 are engaged upon finish of the shifting operation. The second auxiliary change speed device C is manually operated, which also involves the above operation of the forward drive clutch 5, backward drive clutch 6 and quick operating clutch 19.

The hydraulic control system will be described next.

Figure 2:
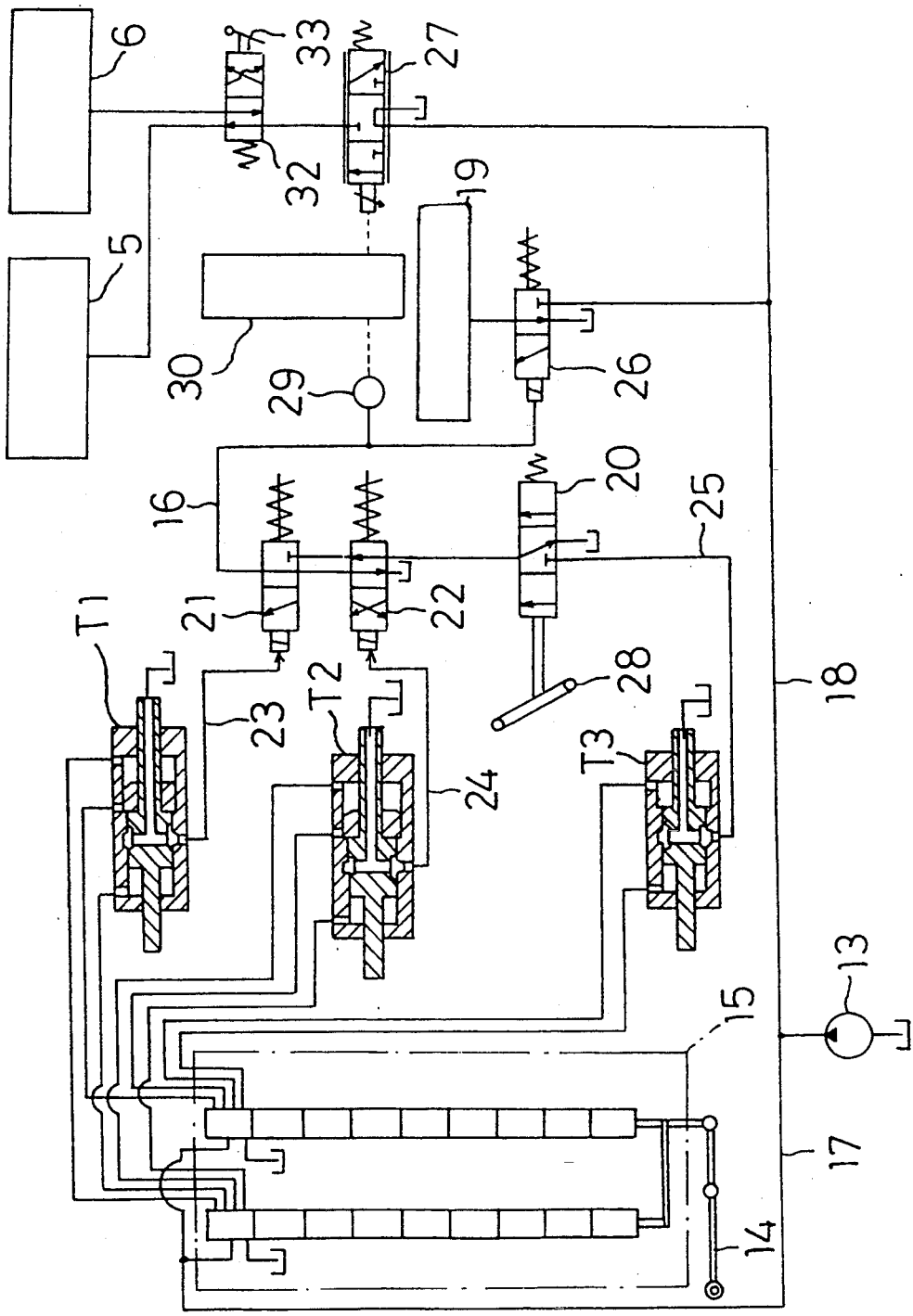
FIG. 2 is a diagram of hydraulic circuitry including hydraulic cylinders for gear shift operations, a quick operating clutch, and hydraulically operable forward dye and backward drive clutches.

As shown in FIG. 2, pressure oil is supplied from a hydraulic pump 13 through a rotary valve 15 to the three hydraulic cylinders T1, T2 and T3. This system includes a pilot oil line 16 having a pressure variable when the hydraulic cylinders T1, T2 and T3 are operated and when the second auxiliary change speed device C is operated. The pressure oil from the hydraulic pump 13 is supplied via a first oil line 17 to the rotary valve 15, and via a second oil line 18, an electromagnetic proportional pressure valve 27 and a changeover valve 32 (corresponding to the backward-forward changeover device) to the forward drive clutch 5 and backward drive clutch 6. Further, the pressure oil from the hydraulic pump 13 is supplied via the second oil line 18 and a control valve 26 to the quick operating clutch 19. The system further includes control valves 20, 21 and 22 connected to the hydraulic cylinders T1 and T2 of the main change speed device A and to an auxiliary shift lever 28 of the auxiliary change speed device C, respectively, for controlling pressure in the pilot oil line 16.

FIG. 2 shows a backward-forward changeover lever 33 placed in a forward drive position to supply the pressure oil to the forward drive clutch 5. In this state, the main change speed device A and first and second auxiliary change speed devices B and C are in neutral, and the control valves 20, 21 and 22 are in oil drain positions. During a normal run of the tractor, pilot pressure oil is supplied from one of the hydraulic cylinders T1 and T2 of the main change speed device A to the control valve 21 or 22 through a pilot oil line 23 or 24, to place the control valve 21 or 22 in a communicating position. The control valve 20 of the auxiliary shift lever (second auxiliary change speed device C) is in a low speed or high speed position. Pilot pressure oil is supplied from the hydraulic cylinder T3 of the first auxiliary change speed device B through a pilot oil line 25, control valves 20, 21 and 22 and pilot oil line 16 to the control valve 26 of the quick operating clutch 19.

Consequently, the control valve 26 is placed in a communicating position to allow the quick operating clutch 19 to be engaged by the pressure oil from the second oil line 18. The forward drive clutch 5 also is engaged by the pressure oil flowing through the second oil line 18 and electromagnetic proportional pressure valve 27.

The quick operating clutch 19, as is an ordinary wet clutch, is formed of friction plates (not shown) and a piston (not shown). Thus, the quick operating clutch 19 is operable when the friction plates pressurized by the pressure oil supplied to the piston, to make or break power transmission quickly.

Assume that a shift lever 14 connected to the rotary valve 15 and the auxiliary shift lever 28 are operated during a normal run as noted above (with the control valve 21 or 22 and control valve 20 in the communicating positions, and the pilot pressure oil supplied from the hydraulic cylinder T3 to the control valve 26, placing the control valve 26 in the communicating position).

In this case, when the pressure oil from the rotary valve 15 begins to operate one of the hydraulic cylinders T1, T2 and T3 or the auxiliary shift lever 28 begins to operate the control valve 20, one of the control valves 20, 21 and 22 is moved to a drain position or the pilot oil line 25 is drained by the hydraulic cylinder T3. As a result, the pilot pressure in the pilot oil line 16 is lowered to operate the control valve 26 to a drain position, thereby quickly disengaging the quick operating clutch 19 (point of time A1 in FIGS. 3a and 3b).

When a pressure sensor 29 detects the pressure drop in the pilot oil line 16, a control unit 30 operates the electromagnetic proportional pressure valve 27 to lower the working pressure of the forward drive clutch 5 from pressure P1 which corresponds to a fully engaged state to pressure P2 which is at a predetermined low level. This pressure P2 is at a level for moving the piston of the forward drive clutch 5 barely out of contact with the friction plates (which corresponds to first control means).

Figure 3A:
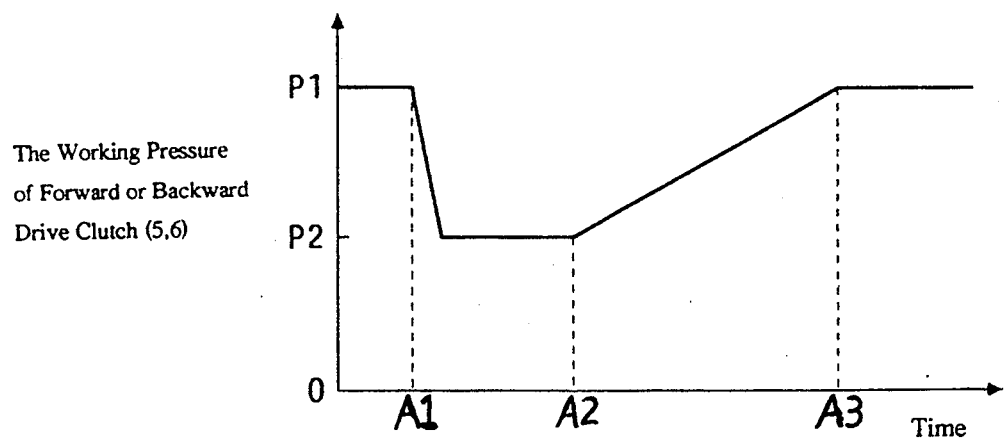
FIG. 3a is a view showing working pressures for the hydraulically operable forward drive and backward drive clutches and FIG. 3b is a view showing the states of the quick operating clutch during a gear shift operation.
Figure 3B:
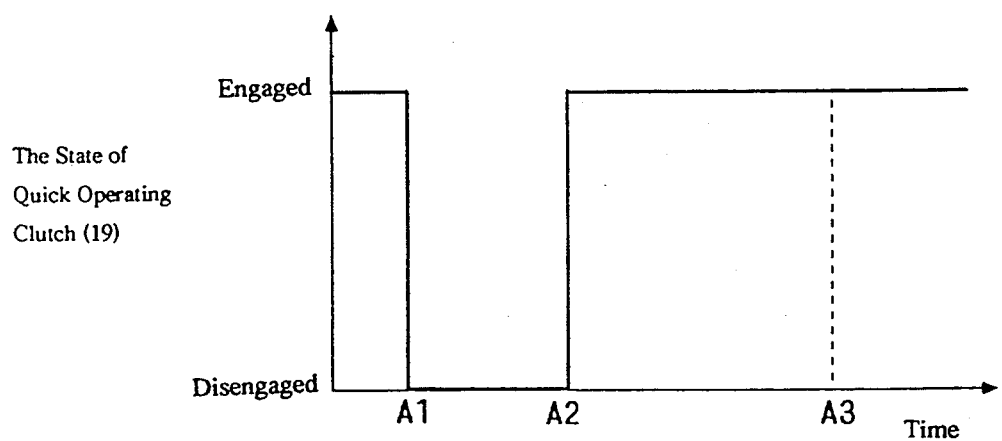

Between points of time A1 and A2 in FIGS. 3a and 3b, the hydraulic cylinders T1, T2 and T3 complete sliding of the shift gears S1 and S2 or the auxiliary shift lever 28 completes a change speed operation. At the point of time A2, the pilot pressure oil from the hydraulic cylinder T1 or T2 returns the control valve 21 or 22 from the drain position to the communicating position or the control valve 20 is returned to the communicating position to supply the pilot pressure oil from the hydraulic cylinder T3 through the pilot oil line 25 to the pilot oil line 16. Thus, at the point of time A2, the control valve 26 is operated to the communicating position for quickly engaging the quick operating clutch 19.

When the pressure sensor 29 detects the pressure rise in the pilot oil line 16, the control unit 30 operates the electromagnetic proportional pressure valve 27 to gradually increase the working pressure of the forward drive clutch 5 from the point of time A2 onward. Consequently, the piston of the forward drive clutch 5 barely out of contact with the friction plates gradually presses upon the friction plates until the forward drive clutch 5 reaches pressure P1 for full engagement at point of time A3 (which corresponds to second control means).

The above action takes place where the backward-forward changeover lever 33 is placed in the forward drive position. Also where the lever 33 is placed in the backward drive position to supply the pressure oil to the backward drive clutch 6, the backward drive clutch 6 and quick operating clutch 19 are automatically controllable during a shifting operation as shown in FIGS. 3a and 3b.

With an operation of the backward-forward changeover lever 33 from the forward drive position to the backward drive position, the changeover valve 32 is switched to the backward drive position to render the tractor movable backward. With an operation of the backward-forward changeover lever 33 from the backward drive position to the forward drive position, the changeover valve 32 is switched to the forward drive position to render the tractor movable forward.

This speed control system as a whole has a simplified structure which dispenses with one clutch, resulting in an advantage of economy.

In the foregoing embodiment, the quick operating clutch 19 is an ordinary type clutch, as are the forward drive clutch 5 and backward drive clutch 6, having a piston pressing upon friction plates. This clutch may be replaced with a clutch using tapered rollers as disclosed in U.S. Pat. No. 5,109,964.

What is claimed is:

1. A control system for controlling change speed gearing of a vehicle for transmitting output of an engine in varied speeds to wheels, comprising:
   a first clutch mechanism adapted to be mounted in a drive transmitting line between the engine and the change speed gearing, said first clutch mechanism including a hydraulically operable forward drive clutch adapted for transmitting drive from the engine directly to the change speed gearing, a hydraulically operable backward drive clutch adapted for transmitting the drive from the engine in backward rotation to the change speed gearing, and backward-forward changeover means for selectively operating said forward drive clutch and backward drive clutch by supplying a hydraulic pressure thereto;
   a second clutch mechanism adapted to be mounted in a drive transmitting line between the change speed gearing and the wheels, said second clutch mechanism including a quick operating clutch adapted for quickly making and breaking drive transmission, and clutch control means for controlling said quick operating clutch;
   actuator means for shifting the change speed gearing; and
   control means operatively connected to said backward-forward changeover means, said clutch control means and said actuator means, said control means including a first control means operable, in response to start of a shifting operation of said actuator means, to disengage said quick operating clutch through said clutch control means and to reduce the hydraulic pressure of an engaged one of said forward drive clutch and said backward drive clutch to a predetermined low pressure through said backward-forward changeover means, and a second control means operable, in response to completion of the shifting operation of said actuator means, to engage said quick operating clutch through said clutch control means and to raise the hydraulic pressure of said one of said forward drive clutch and said backward drive clutch gradually from said predetermined low pressure through said backward-forward changeover means.

2. A control system as defined in claim 1, wherein said backward-forward changeover means includes a changeover valve operatively connected to said forward drive clutch and said backward drive clutch, and a backward-forward changeover lever for operating said changeover valve.

3. A control system as defined in claim 1, wherein said first clutch mechanism further includes an electromagnetic proportional pressure valve operatively connected thereto for operating said forward drive clutch and said backward drive clutch.

4. A control system as defined in claim 1, wherein said clutch control means comprises a control valve interlocked to said actuator means and a pilot oil line.

5. A control system as defined in claim 4, wherein said control valve is quickly switchable between a communicating position and a shutting position with variations in hydraulic pressure of said pilot oil line.

6. A control system as defined in claim 1, wherein said control means is adapted to be operatively connected to the change speed gearing, and adapted to be operable in response to the shifting operation of the change speed gearing to generate an output signal for operating an electromagnetic proportional pressure valve operatively connected to said first clutch mechanism.

7. A control system as defined in claim 1, wherein said first control means includes:
   a pilot oil line adapted to be connected to the change speed gearing, and adapted to have an internal pressure lowered in response to start of the shifting operation of the change speed gearing;

a pressure sensor for detecting pressure variations in said pilot oil line;

a control unit for generating a first output signal corresponding to a pressure drop detected by said pressure sensor;

an electromagnetic proportional pressure valve connected to said first clutch mechanism for operating said first clutch mechanism, said electromagnetic proportional pressure valve being gradually closable in response to said first output signal; and said quick operating clutch quickly disengageable in response to the pressure drop in said pilot oil line.

8. A control system as defined in claim 1, wherein said second control means includes:

a pilot oil line adapted to be connected to the change speed gearing, and adapted to have an internal pressure raised in response to completion of the shifting operation of the change speed gearing;

a pressure sensor for detecting pressure variations in said pilot oil line;

a control unit for generating a second output signal corresponding to a pressure increase detected by said pressure sensor;

an electromagnetic proportional pressure valve connected to said first clutch mechanism for operating said first clutch mechanism, said electromagnetic proportional pressure valve being gradually openable in response to said second output signal; and said quick operating clutch quickly engageable in response to the pressure increase in said pilot oil line.

* * * * *